UNITED STATES PATENT OFFICE.

ANDREW A. DUNHAM, OF BAINBRIDGE, NEW YORK, ASSIGNOR TO THE CASEIN MANUFACTURING COMPANY, A CORPORATION OF VERMONT.

ART OF PREPARING CASEIN GLUES.

1,391,769.     Specification of Letters Patent.     Patented Sept. 27, 1921.

No Drawing.     Application filed August 1, 1919. Serial No. 314,611.

*To all whom it may concern:*

Be it known that I, ANDREW A. DUNHAM, a citizen of the United States, residing at Bainbridge, in the county of Chenango and State of New York, have invented or discovered certain new and useful Improvements in the Art of Preparing Casein Glues, of which the following is a specification.

This invention has for its object the production of a waterproof casein glue or cement, having particular reference to an improvement in the waterproof glue or cement set forth in my co-pending application No. 222,961.

I have discovered that in the production of a waterproof casein glue or cement it is quite important that such glue should have the property of jelling or setting, while yet in solution, after a certain period of time. I have found that a casein glue or cement not possessing this property does not give as good waterproof results as one having this property. I have further found that the length to time required for this jelling or setting action depends largely upon the quality of the casein used. With some caseins the jelling or setting action takes place in a comparatively short time, while with other caseins this jelling or setting action does not take place for a matter of several hours.

The object of this invention is to standardize the time of jelling or setting of casein waterproof glues.

The preferred method of preparing such glue or cement is as follows: Commercial casein about 70 parts, sodium phosphate, about 10 parts, calcium hydroxid, about 20 parts, are mixed together either dry or in water; to this mixture is then added a sufficient quantity of dry sodium silicate to govern the jelling action of the glue to the proper period of time. The quantity of dry sodium silicate should be determined by small tests until the proper quantity to give the glue the proper setting qualities is determined. It has been found that 5% of dry sodium silicate is ordinarily sufficient for the purpose, but, as previously stated, this proportion should be varied according to the quality of the casein to secure the result desired.

It is understood that the invention is not limited to the above proportions of dry sodium silicate, nor to the use of dry sodium silicate, as any chemical equivalent of sodium silicate having the property of governing the length of time required for the jelling or setting of casein waterproof glues or cements may be used.

Having thus described my invention or discovery I claim and desire to secure by Letters Patent:

A casein glue composition consisting of about 70 parts of casein, about 10 parts of sodium phosphate, and about 20 parts of calcium hydroxid, to which is added a small percentage of sodium silicate to govern the jelling or setting action of the glue.

In testimony whereof I affix my signature.

ANDREW A. DUNHAM.

Witness:
   HAROLD M. LORD.